US008527252B2

(12) United States Patent
Kephart et al.

(10) Patent No.: US 8,527,252 B2
(45) Date of Patent: Sep. 3, 2013

(54) REAL-TIME SYNCHRONIZED CONTROL AND SIMULATION WITHIN A PROCESS PLANT

(75) Inventors: Richard W. Kephart, Kittanning, PA (US); Xu Cheng, Pittsburgh, PA (US); Steven J. Schilling, Pittsburgh, PA (US); Robert L. Yeager, Gibsonia, PA (US)

(73) Assignee: Emerson Process Management Power & Water Solutions, Inc., Pittsburgh, PA (US)

( * ) Notice: Subject to any disclaimer, the term of this patent is extended or adjusted under 35 U.S.C. 154(b) by 1120 days.

(21) Appl. No.: 11/495,812

(22) Filed: Jul. 28, 2006

(65) Prior Publication Data

US 2008/0027704 A1      Jan. 31, 2008

(51) Int. Cl.
| | |
|---|---|
| *G06G 7/62* | (2006.01) |
| *G06F 9/44* | (2006.01) |
| *G06F 9/455* | (2006.01) |
| *G06F 13/10* | (2006.01) |
| *G06F 13/12* | (2006.01) |

(52) U.S. Cl.
USPC ............................................. 703/13; 703/21

(58) Field of Classification Search
USPC ................. 703/3, 6, 7, 9, 13, 22; 700/28–31
See application file for complete search history.

(56) References Cited

U.S. PATENT DOCUMENTS

| | | | |
|---|---|---|---|
| 5,268,834 A | 12/1993 | Sanner et al. | |
| 5,568,378 A * | 10/1996 | Wojsznis | 700/44 |
| 5,752,008 A * | 5/1998 | Bowling | 703/13 |
| 5,806,053 A | 9/1998 | Tresp et al. | |
| 6,373,033 B1 * | 4/2002 | de Waard et al. | 219/497 |
| 6,445,963 B1 * | 9/2002 | Blevins et al. | 700/44 |
| 6,459,939 B1 * | 10/2002 | Hugo | 700/44 |
| 6,622,059 B1 * | 9/2003 | Toprac et al. | 700/121 |
| 6,720,393 B1 * | 4/2004 | George et al. | 526/64 |
| 6,721,609 B1 * | 4/2004 | Wojsznis et al. | 700/28 |

(Continued)

FOREIGN PATENT DOCUMENTS

TW      494356 B      7/2002

OTHER PUBLICATIONS

Andre Hanisch et al., "Initialization of Online Simulation Models", Proceedings of the 2005 Winter Simulation Conference, M. E. Kuhl, N. M. Steiger, F. B. Armstrong, and J. A. Joines, eds., Dec. 4-7, 2005, pp. 1795-1803.*

(Continued)

*Primary Examiner* — Suzanne Lo
(74) *Attorney, Agent, or Firm* — Marshall, Gerstein & Borun LLP (57) ABSTRACT

A process control system simulation technique performs real-time simulation of an actual process control network as that network is running within a process plant in a manner that is synchronized with the operation of the actual process control network. This real-time, synchronized simulation system includes a simulation process control network and a process model which are automatically updated periodically during the operation of the actual process control network to reflect changes made to the process control network, as well as to account for changes in the plant itself, i.e., changes which require an updated process model. The simulation system provides for more readily accessible and usable simulation activities, as the process control network and the process models used within the simulation system are synchronized with and up-to-date with respect to the current process operating conditions.

30 Claims, 5 Drawing Sheets

(56) References Cited

U.S. PATENT DOCUMENTS

| | | | |
|---|---|---|---|
| 6,745,088 B2* | 6/2004 | Gagne | 700/29 |
| 7,110,835 B2 | 9/2006 | Blevins et al. | |
| 7,257,523 B1* | 8/2007 | Nixon et al. | 703/13 |
| 2002/0010571 A1 | 1/2002 | Daniel et al. | |
| 2004/0153804 A1 | 8/2004 | Blevins et al. | |
| 2004/0249483 A1* | 12/2004 | Wojsznis et al. | 700/52 |
| 2005/0096872 A1* | 5/2005 | Blevins et al. | 702/183 |
| 2007/0078530 A1* | 4/2007 | Blevins et al. | 700/29 |
| 2007/0129917 A1 | 6/2007 | Blevins et al. | |
| 2007/0168065 A1 | 7/2007 | Nixon et al. | |
| 2007/0174225 A1 | 7/2007 | Blevins et al. | |

OTHER PUBLICATIONS

Jietae Lee, "On-line PID Controller Tuning from a Single, Closed-Loop Test", AlChE Journal, vol. 35, No. 2, Feb. 1989, pp. 329-331.*

Chinese Office Action for Application No. 200710137613.X, dated Apr. 14, 2010.

Great Britain Search Report for Application No. GB0714596.4, dated Sep. 27, 2007.

Examination Report for Application No. GB0714596.4, dated Oct. 11, 2010.

Examination Report for Application No. GB0714596.4, dated Aug. 25, 2011.

* cited by examiner

REAL-TIME SYNCHRONIZED CONTROL AND SIMULATION WITHIN A PROCESS PLANT

TECHNICAL FIELD

The present invention relates generally to process plants such as power generation and industrial manufacturing plants and, more particularly, to a real-time control and simulation system that performs synchronized simulation of the operation of the control network within the process plant.

DESCRIPTION OF THE RELATED ART

Distributed process control systems, like those typically used in power generation, chemical manufacturing, petroleum processing or other process plants, typically include one or more process controllers communicatively coupled to one or more field devices via analog, digital or combined analog/digital buses. The field devices, which may be, for example, valves, valve positioners, switches, transmitters (e.g., temperature, pressure, level and flow rate sensors), burners, etc. are located within the process environment and perform process functions such as opening or closing valves, measuring process parameters, etc. in response to control signals developed and sent by the process controllers. Smart field devices, such as the field devices conforming to any of the well-known Fieldbus protocols may also perform control calculations, alarming functions, and other functions commonly implemented within or by a process controller. The process controllers, which are also typically located within the plant environment, receive signals indicative of process measurements made by the field devices and/or other information pertaining to the field devices and execute a control application that runs, for example, different control modules which make process control decisions, generate process control signals based on the received information and coordinate with the control modules or blocks being performed in the field devices, such as HART and Fieldbus field devices. The control modules within the controller send the process control signals over the communication lines to the field devices to thereby control the operation of the process.

Information from the field devices and the controller is usually made available over a data highway to one or more other computer devices, such as operator workstations, personal computers, data historians, report generators, centralized databases, etc., typically placed in control rooms or other locations away from the harsher plant environment. These computer devices may also run applications that may, for example, enable an operator to perform functions with respect to the process, such as changing settings of the process control routine, modifying the operation of the control modules within the controller or the field devices, viewing the current state of the process, viewing alarms generated by field devices and controllers, keeping and updating a configuration database, etc.

As an example, the Ovation® control system, sold by Emerson Process Management, includes multiple applications stored within and executed by different devices located at diverse places within a process plant. A configuration application, which resides in one or more operator workstations, enables users to create or change process control modules and to download these process control modules via a data highway to dedicated distributed controllers. Typically, these control modules are made up of communicatively interconnected function blocks, which are objects in an object oriented programming protocol and which perform functions within the control scheme based on inputs thereto and provide outputs to other function blocks within the control scheme. The configuration application may also allow a designer to create or change operator interfaces which are used by a viewing application to display data to an operator and to enable the operator to change settings, such as set points, within the process control routine. Each of the dedicated controllers and, in some cases, field devices, stores and executes a controller application that runs the control modules assigned and downloaded thereto to implement actual process control functionality. The viewing applications, which may be run on one or more operator workstations, receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may be executed in a still further computer attached to the data highway to store the current process control routine configuration and data associated therewith. Alternatively, the configuration database may be located in the same workstation as the configuration application.

As noted above, operator display applications are typically implemented on a system wide basis in one or more of the workstations and provide preconfigured displays to the operator or maintenance persons regarding the operating state of the control system or the devices within the plant. Typically, these displays take the form of alarming displays that receive alarms generated by controllers or devices within the process plant, control displays indicating the operating state of the controllers and other devices within the process plant, maintenance displays indicating the operating state of the devices within the process plant, etc. These displays are generally preconfigured to display, in known manners, information or data received from the process control modules or the devices within the process plant. In some known systems, displays are created through the use of objects that have a graphic associated with a physical or logical element and that is communicatively tied to the physical or logical element to receive data about the physical or logical element. The object may change the graphic on the display screen based on the received data to illustrate, for example, that a tank is half full, to illustrate the flow measured by a flow sensor, etc. While the information needed for the displays is sent from the devices or configuration database within the process plant, that information is used only to provide a display to the user containing that information. As a result, all information and programming that is used to generate alarms, detect problems within the plant, etc. must be generated by and configured within the different devices associated with the plant, such as controllers and field devices during configuration of the process plant control system. Only then is this information sent to the operator display for display during process operation.

Moreover, it is frequently desirable to develop and place a simulation system within the plant to simulate the operation of the control network as connected within the plant. Such a simulation system may be used to test the operation of the plant in response to new or different control variables, such as set-points, to test new control routines, to perform optimization, to perform training activities, etc. As a result, many simulation systems have been proposed and used in process plants. None-the-less, only the most complex simulation systems are typically able to perform high fidelity simulation of the process plant because of the ever changing conditions within the plant, including the degradation of devices over time, as well as the presence of unaccounted for disturbance variables within the plant. Moreover, in many known controller systems, it can be difficult to set up or create a simulation of the process plant or a portion of the process plant as simulation activities are performed separately from the display and control activities performed in the on-line environment of the process plant. As a result, the simulation system is not closely coordinated with the actual operation of the control network within the process plant. In other words, simulation systems, once set up, are typically run separately from the controllers within the plant to simulate the operation of the process control network installed within the plant, and therefore these simulation systems can easily become de-tuned from the actual control network within the plant. Moreover, the process model used in the simulation system may quickly diverge from the actual process operation. Still further, it can be difficult to integrate the simulation system with the operator displays or with the control modules being implemented within the plant.

Still further, simulation is made more difficult in a power plant control system as well as some other types of control systems where it is typical for the control functions to be segmented into various different control machines (or processors) based on criteria such as the physical location of the associated plant equipment, the dynamic properties of the process variables of interest and fault tolerance and redundancy considerations. The physical location of the affected equipment is important due mainly to mechanical considerations and constraints associated with such things as the length of the corresponding wires. Here, the process dynamics affect the control function segmentation by placing requirements and constraints on the execution period of the control functions that are associated with the particular process variables, all of which must be simulated within the simulation system. In power plants, the fault tolerance considerations are aimed at reducing the impact of processor and computer failures on electricity generation.

In any event, while most utilities and other plants incorporate an off-line simulator for operator training as well as engineering analysis, this traditional approach treats the control and simulation functions as two totally separate and diverse entities, each of which must be separately created, run and configured to operate correctly. As a result, the simulation systems used in these plants can quickly become out of tune with the process and thus may not be very accurate, and these simulation systems are typically not very easy to use.

SUMMARY

A process control simulation technique performs real-time simulation or prediction of an actual process control network as that network is running within a process plant in a manner that is synchronized with the operation of the actual process control network. In particular, this synchronized simulation system is automatically updated periodically during the operation of the actual process control network to reflect changes made to the actual process control network, as well as to account for changes which occur within the plant itself, i.e., changes which require updating a process model used within the simulation system. The synchronized simulation system described herein provides for a more readily accessible and usable simulation system, as the plant models used within the simulation system are synchronized with and up-to-date with respect to the current process operating conditions.

Additionally, the disclosed simulation system is more accurate as it uses process models developed from the current state of the process at the time that the simulation system is initiated to perform a particular simulation. Still further, this simulation system is easy to use, as it can use the same user interface applications as are used within the process control network to perform man-machine interface (MMI) activities. Likewise, this simulation system can be initialized and used at any time during operation of the process plant without any significant configuration or set-up activities, because the simulation system is always up-to-date with respect to the control network actually being used within the process plant when it is initially placed in a prediction mode. Thus, the operator merely needs to specify any changes to the simulation control system that are to be used in the simulation, and the simulation system is ready to operate to perform accurate simulation or prediction, as the simulation system remains synchronized with the process plant.

Generally speaking, the simulation system described herein alternates between executing in one of two different modes, including a tracking mode and a prediction mode. In the tracking mode, the simulation system communicates with the process control network to obtain various types of state data from the process control network that is needed to keep both the process control network and the process model of the simulation system synchronized with the actual process control network and with the process being controlled. This information may include, for example, state variables defining the operation of the process controllers, measured process variables, and process control signals as developed by the controllers within the process plant. This information may be received periodically during operation of the process control network, and in one embodiment, may be received at the scan rate of the process controllers within the actual process control network (i.e., at the rate at which the process controllers operate to produce new control signals). During the tracking mode, the simulation system uses the collected state information to develop an updated controller state variable for use in configuring the simulated control network and updates a process model to model the process based on the most recently collected information.

During the prediction mode, the operator may specify new control variables, such as set-points, to be used during the simulation, and the simulation system then operates to simulate control of the process, based on the most recent process model. The simulation system may be operated in a real-time sub-mode, in a fast-time sub-mode or in slow-time sub-mode, depending on the desires of the operator. In any event, the simulation system may, for example, simulate the operation of the actual process control network in response to a changed control variable, a changed control routine, a process disturbance, etc. Alternatively, if desired, the simulation system may operate to simulate the operation of the process plant in fast time to determine an indication of the steady state operation of the process at a control horizon, or to otherwise predict the operation of the plant or some variable thereof at some future point in time.

Because the simulation system, when it enters the prediction mode, is synchronized with the actual process control network and the process plant as currently operating, the simulation system provides a more accurate simulation or prediction of the operation of the process plant in response to the control variables used in the simulation. Moreover, because the simulation system is synchronized with the process plant upon activation of the simulation system, the operator does not need to perform any significant configuration or updating of the simulation system prior to initiating the simulation system, making this system easy to use. Still further, because the simulation system is synchronized with the process control network, the simulation system may use the same user interface routines, making the simulation system look and feel the same as the control system, again making the simulation system easier to use and understand.

DESCRIPTION OF THE PREFERRED EMBODIMENTS

Figure 1:
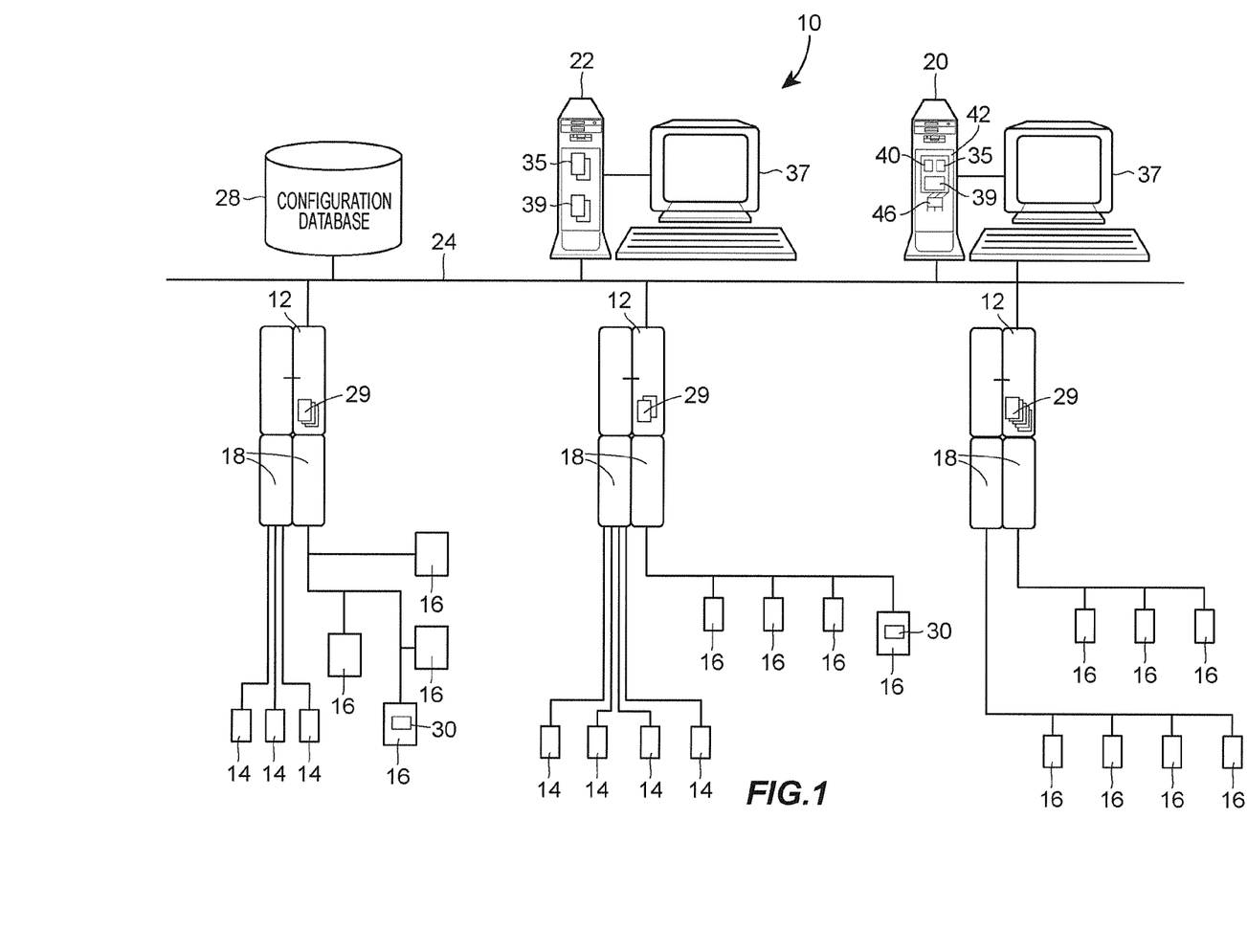
FIG. 1 is a block diagram of a distributed process control network located within a process plant including an operator workstation that implements a simulation system configured to be synchronized with the operation of an actual process control network, to thereby simulate the operation of the process plant.

Referring now to FIG. 1, an example control network for process plant 10, such as that associated with a power generation plant, is illustrated in detail. The process plant 10 of FIG. 1 includes a distributed process control system having one or more controllers 12, each of which is connected to one or more field devices 14 and 16 via input/output (I/O) devices or cards 18 which may be, for example, Fieldbus interfaces, Profibus interfaces, HART interfaces, standard 4-20 ma interfaces, etc. The controllers 12 are also coupled to one or more host or operator workstations 20 and 22 via a data highway 24 which may be, for example, an Ethernet link. A database 28 may be connected to the data highway 24 and operates as a data historian to collect and store parameter, status and other data associated with the controllers 12 and field devices 14, 16 within the plant 10. Additionally or alternatively, the database 28 may operate as a configuration database that stores the current configuration of the process control system within the plant 10 as downloaded to and stored within the controllers 12 and field devices 14 and 16. While the controllers 12, the I/O cards 18 and the field devices 14 and 16 are typically located down within and are distributed throughout the sometimes harsh plant environment, the operator workstations 20 and 22 and the database 28 are usually located in control rooms or other less harsh environments easily assessable by controller or maintenance personnel.

As is known, each of the controllers 12, which may be by way of example, the Ovations® controller sold by Emerson Process Management Power and Water Solutions, Inc., stores and executes a controller application that implements a control strategy using any number of different, independently executed, control modules or blocks 29. Each of the control modules 29 can be made up of what are commonly referred to as function blocks wherein each function block is a part or a subroutine of an overall control routine and operates in conjunction with other function blocks (via communications called links) to implement process control loops within the process plant 10. As is well known, function blocks, which may but need not be objects in an object oriented programming protocol, typically perform one of an input function, such as that associated with a transmitter, a sensor or other process parameter measurement device, a control function, such as that associated with a control routine that performs proportional-integral-derivative (PID), fuzzy logic, etc. control, or an output function that controls the operation of some device, such as a valve, to perform some physical function within the process plant 10. Of course hybrid and other types of complex function blocks exist such as model predictive controllers (MPCs), optimizers, etc. While the Fieldbus protocol and the Ovation® system protocol use control modules and function blocks designed and implemented in an object oriented programming protocol, the control modules could be designed using any desired control programming scheme including, for example, sequential function chart, ladder logic, etc. and are not limited to being designed and implemented using the function block or any other particular programming technique.

In the plant 10 illustrated in FIG. 1, the field devices 14 and 16 connected to the controllers 12 may be standard 4-20 ma devices, may be smart field devices, such as HART, Profibus, or FOUNDATION® Fieldbus field devices, which include a processor and a memory, or may be any other desired type of field device. Some of these devices, such as Fieldbus field devices (labeled with reference number 16 in FIG. 1), may store and execute modules, or sub-modules, such as function blocks, associated with the control strategy implemented in the controllers 12. Function blocks 30, which are illustrated in FIG. 1 as being disposed in two different ones of the Fieldbus field devices 16, may be executed in conjunction with the execution of the control modules 29 within the controllers 12 to implement one or more process control loops, as is well known. Of course, the field devices 14 and 16 may be any types of devices, such as sensors, valves, transmitters, positioners, etc. and the I/O devices 18 may be any types of I/O devices conforming to any desired communication or controller protocol such as HART, Fieldbus, Profibus, etc.

Still further, in a known manner, one or more of the workstations 20 and 22 may include user interface applications to enable a user, such as an operator, a configuration engineer, a maintenance person, etc. to interface with the process control network within the plant 10. In particular, the workstation 22 is illustrated as including one or more user interface applications 35 which may be executed on a processor within the workstation 22 to communicate with the database 28, the control modules 29 or other routines within the controllers 12 or I/O devices 18, with the field devices 14 and 16 and the modules 30 within these field devices, etc. to obtain information from the plant, such as information related to the ongoing state of the process control system. The user interface applications 35 may process and/or display this collected information on a display device 37 associated with one or more of the workstations 20 and 22. The collected, processed and/or displayed information may be, for example, process state information, alarms and alerts generated within plant, maintenance data, etc. Likewise, one or more applications 39 may be stored in and executed in the workstations 22 and 20 to perform configuration activities such as creating or configuring the modules 29 and 30 to be executed within the plant, to perform control operator activities, such as changing setpoints or other control variables, within the plant, etc. Of course the number and type of routines 35 and 39 is not limited by the description provided herein and other numbers and types of process control related routines may be stored in and implemented within the workstations 20 and 22 if desired.

The workstation 20 of FIG. 1 is also illustrated as including a simulation application 40 which may include a process plant simulator, a user interface application and data structures for performing synchronized simulation of the process plant 10 in the manner described herein. The simulation application 40 can be accessed by any authorized user (such as a configuration engineer, an operator or some other type of user) to perform simulation of the process plant control network being implemented by the control blocks 29 and 30 as well as other controller routines executed within the controllers 12 and possibly the field devices 14, 16. The simulation application 40 enables a user to perform different simulation and prediction activities with respect to the process plant 10 while the control system of the process plant 10 remains operational and on-line to control the plant 10.

As illustrated in FIG. 1, the simulation application 40 is stored in a memory 42 of the workstation 20 and each of the components of the simulation application 40 is adapted to be executed on a processor 46 associated with the workstation 20. While the entire simulation application 40 is illustrated as being stored in the workstation 20, some components of this application could be stored in and executed in other workstations or computer devices within or associated with the plant 10. Furthermore, the simulation application 40 can provide display outputs to the display screen 37 associated with the workstation 20 or any other desired display screen or display device, including hand-held devices, laptops, other workstations, printers, etc. Likewise, the simulation application 40 may be broken up and executed on two or more computers or machines that may be configured to operate in conjunction with one another.

Generally speaking, the simulation application 40 provides for or enables the simulation of the operation of the process plant 10 and in particular, the simulation of the process plant control system implemented by the control routines 29 and 30 within the controllers 12 and field devices 14 and 16, in conjunction with the actual plant being controlled. While the plant that is being controlled will be described herein as a power generation plant being controlled using distributed control techniques, the synchronized simulation technique described herein can be used in other types of plants and control systems, including industrial manufacturing plants, water and waste water treatment plants, as well as control systems implemented centrally or within a single computer, and therefore not distributed throughout the plant.

Figure 2:
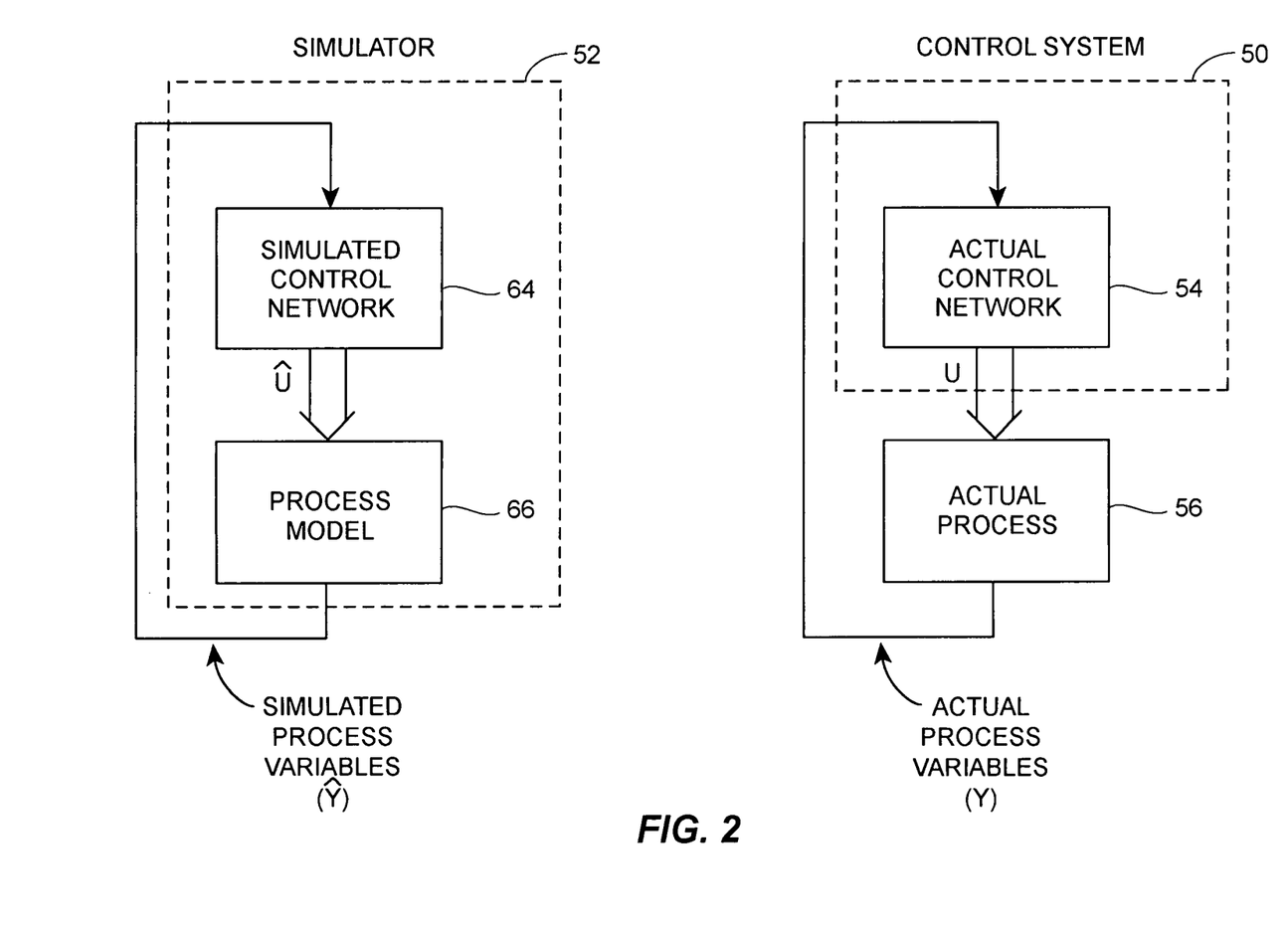
FIG. 2 is a logical block diagram of a process plant control system and a simulation system for simulating the process plant control system.

FIG. 2 generally illustrates a process control system 50 and a simulation system 52 implemented within the plant 10 of FIG. 1. In particular, the process control system 50 includes an actual process control network 54 communicatively and physically coupled to a process 56. As will be understood, the actual process control network 54 includes the control modules 29 and 30 of FIG. 1 as well and any other control routines disposed in and executed within the various control devices (e.g., controllers 12) and field devices (e.g., devices 14 and 16) of the plant 10 of FIG. 1. Likewise, the actual process 56 includes the units, machines, devices and associated hardware set up to implement the process being controlled. For example, in a power generation plant, the process 56 may include generators, fuel delivery systems including heat exchanges, condensers, steam generators, valves, tanks, etc. as well as sensors and transmitters disposed within the plant to measure various process parameters or variables. Thus, as illustrated in FIG. 2, the actual process control network 54 includes the controllers which produce one or more control signals to be delivered to the various control devices within the process 56 and which operate to control the process 56 according to some specific control technique. These control signals are illustrated by the vector U in FIG. 2 to indicate that the actual process control network 54 may provide a vector of control signals to the process 56 to control the operation of the plant. Likewise, as illustrated in FIG. 2, a vector Y of process variables are measured within the process 56 (such as by sensors, etc.) and are delivered as feedback signals to the process control network 54 for use in producing the control signals U. Of course, the actual control network 54 can include any desired types of controllers which implement any desired types of control routines or techniques, such as PID, fuzzy logic, neural network, model predictive control routines, etc.

As illustrated in FIG. 2, the simulation system 52 includes a simulated control network 64 and a process model 66. The simulated control network 64 is, generally speaking, a copy of the actual process control network 54 including a copy or a duplicate of the control routines associated with and/or running within the actual controllers and other devices of the process control network 54. However, instead of being distributed within multiple different devices, the simulated control network 64 may include one or more communicatively connected control modules that are implemented on a single computer device, such as the operator workstation 20 of FIG. 1. Such a simulation system that stores and simulates, on a single computer, various control routines designed to be implemented in different computers as part of a distributed control network is described in detail in U.S. patent application Ser. No. 09/510,053, filed on Feb. 22, 2000, entitled "Integrating Distributed Process Control System Functionality on a Single Computer" the disclosure of which is hereby expressly incorporated by reference herein. In any event, the simulation system 52 may be implemented as part of the simulation application 40 of FIG. 1. Moreover, the process model 66 used within the simulation system 52 is designed and configured to model the process 56, and may be implemented as any desired or suitable type of process model, such as an $n^{th}$ order transfer function model, a neural network model, etc. Of course, the type of model to be used may be chosen as the best type of model for the particular type of plant or process being modeled, as well one that enables on-line updating capabilities as described in more detail below. Still further, if desired, the process model 66 may be made up of a plurality of individual process models, each modeling or associated with a different part of the plant 10, such as with a different control loop within the plant 10.

The overall concept of the simulation approach as outlined in FIG. 2 provides a simulation system 52 that includes a control network 64 developed as a copy of the actual control network 54 and a process model 66 that models the actual process 56 of the plant. In this configuration, the control network 54 and therefore the simulated control network 64 includes of all functions and components that make up the actual control network 54 (e.g. the controllers, the function blocks, the man-machine-interface applications (MMIs), etc. of the actual control network). Of course, the simulated control network 64 of the simulation system 52 may be developed by copying the actual control routines (e.g., the control routines 29 and 30 of FIG. 1), the user interface applications, the configuration applications, etc. as stored in, for example, the configuration database 28 of FIG. 1, the controllers 12, the field devices 4, 16, the workstations 20, 22, etc., along with storing data or other information related to identifying the associated inputs and outputs of the control routines within the process plant. This input/output signal identification data is helpful to enable the simulation system 52 to communicate with the control system 50 during operation of the control system 50 to thereby synchronize the operation of the simulation system 52 with the control system 50 while the process plant is operating on-line.

As will be understood, during operation of the plant, the actual control network 54 operates in any usual or known manner to calculate the manipulated variables or control signals U which are applied to the process 56. The process 56 then responds by operating to develop actual process variables Y, which are measured by various sensors within the plant and are provided as feedback to the control network 54. The manipulated and process variables (U and Y, respectively) are shown as vector quantities to designate a plurality of values. Of course, each of the associated elements of these vector quantities may be made up of discrete values with respect to time, wherein the size of each time step is equal to the execution period of the associated control function, i.e., the scan or operation rate of the controllers.

As will be understood, the values of the manipulated variables (control signals) U are calculated at each time step, and the values of the process variables Y result from sampling the process variables at each time step. For the purpose of this discussion, the current time step is denoted as a time k and thus the values of the manipulated variables and the process variables at the current time step are denoted as $U_k$ and $Y_k$ respectively. Thus, according to this operation, the time response of the control network 54 is completely determined by the vectors U, Y and a vector of internal state variables X which defines the specifics of the control procedures (or controller configurations) used in the control network 54, e.g., the controller gains or other parameters defining the specifics of the control techniques implemented by the controllers within the control network 54. In other words, the elements of the state vector X define the internal variables that are used by the control functions to calculate the manipulated variables U. These state variables may be, for example, values that are a function of the tuning parameters or accumulated time values used by such functions as timers, integrator values utilized by PID controllers, neural network weighting coefficients used by neural network controllers, scaling factors used by fuzzy logic controllers, model parameters or matrices used by model predictive controllers, etc. These state values are also discrete with respect to time and thus the state vector X at the kth time step is denoted as $X_k$. The collective set of state vectors U, Y, X can then be said to define the overall state of the control system. These values are continuously calculated by the control system.

Figure 3:
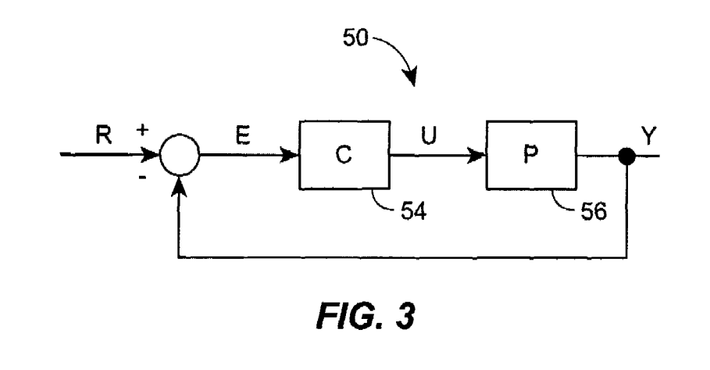
FIG. 3 is a simplified logical block diagram of a control loop of the plant control system shown in FIG. 2.

Referring now to FIG. 3, the control system 50 of FIG. 2 is illustrated in block diagram form as a feedback control loop. In this case, the actual control network 54 is represented by the block denoted as C. The process 56 is represented by the block denoted as P. Moreover, in this case, the input to the control network 54 is shown as a vector of set-points R which are compared to the measured or determined process variables Y to produce an error vector E which, in turn, is used by the control network 54 to produce the control signal or manipulated variable vector U. Of course, the elements of the set-point vector R represent the desired values for the process variables Y that are to be controlled, and these set-point values are generally determined by an operator or an optimizer routine (not shown). In the case of a power plant control system, these set-point values may be the desired values of flow, pressure, temperature, megawatts, etc. for the associated process variables within the power generation equipment.

Figure 4:
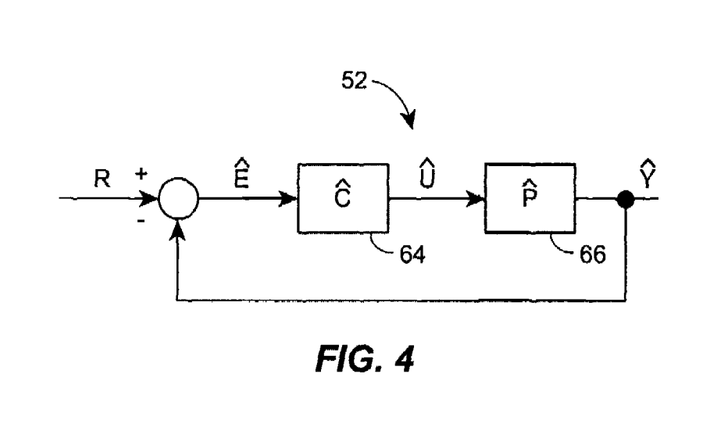
FIG. 4 is a simplified logical block diagram of a simulated control loop implemented by the simulation system shown in FIG. 2.

In a similar manner, the simulation system 52 is shown in block diagram form in FIG. 4. The same vector R of set-point values from the actual control network 54 is input to the simulation system 52. Here, the simulated control network 64 is denoted by the block $\hat{C}$ and is a replication of the control network 54 in terms of controller operation. Thus, all of the controllers, function block and algorithms that make up the actual control network 54 are replicated in the simulated control network 64. The simulated manipulated variables or control signals $\hat{U}$ are shown as being produced or calculated by the simulated control network 64 and provided to the process model 66.

In the simulation system 52, however, the values of the process variables $\hat{Y}$ are calculated using a mathematical model of the process 56, referred to as the process model 66 and denoted as $\hat{P}$. Of course, the exact structure of the process model 66 can vary and, furthermore, various different model structures can be utilized for various different parts of the process 56 so that, for example, each process variable can utilize or be determined by a unique process model structure. Applicable model structures that may be used include first principle (differential equation) models, transfer function (ARX) models, state space models, neural network model, fuzzy logic models, etc.

Like the actual control system 50, the time response of the simulation system 52 is completely described by the $\hat{U}$, $\hat{Y}$ and $\hat{X}$ vectors. Here, the elements of the simulator state vector $\hat{X}$ contain the identical state variables X as in the actual control system 50. However, the simulator state vector $\hat{X}$ also includes additional elements which are the internal state variables associated with the process model 66, and these variables are used by the process model 66, along with the manipulated variables $\hat{U}$, to calculate the simulated process variables $\hat{Y}$.

Thus the simulator state vector $\hat{X}$ is an augmentation of the control system state vector X where $\hat{X}$ includes the control system state vector (denoted as θ) and the vector of process model internal state variables (denoted as ψ). Here, the values of θ are identical to X.

The simulator model architecture is preferably such that the value of each of the model internal state variables ($\psi_k$) at the kth time step can be calculated using the $U_{k-1}$ and $Y_k$ vectors from the control system. Of course, the details of the specific calculations are specific and particular to the particular model structure that is employed, and these calculations are known to those of ordinary skill in the art. Moreover, it will be realized that the process state variables that are calculated by the simulator system can be a function of the process variables and manipulated variables as well as, in some instances, the process variables and/or the manipulated themselves. This all depends on the type of models that are employed. In any event, this property enables the synchronization of the actual control system 50 and the simulation system 52 during normal operation of the process plant. In particular, at the kth time step, the total simulator state can be synchronized to the total control system state using the $U_{k-1}$, $X_k$ and $Y_k$ vectors. For the simulator total state update, the elements of $\theta_k$ are updated directly from the vector $X_k$ and the elements of the process state vector $\psi_k$ are calculated (determined) using $U_{k-1}$ and $Y_k$. Again the specific details of the calculations depend on the structure of the process model that is employed.

Thus, generally speaking, during operation, the simulation system 52 operates in parallel with but in a manner that is synchronized with the operation of the process control system 50. In particular, if the simulation system 52 was simply operated in parallel with the actual control system 50 but not synchronized therewith, the simulated process variables $\hat{Y}$ would eventually tend to drift from the actual process variables Y output from the process 56, due mainly to the effects of un-modeled dynamics and plant-model mismatch.

To overcome this problem, the simulation system 52 remains synchronized with the actual control system 50 by periodically operating in a tracking mode in which the simulation system 52 receives the $U_{k-1}$, $Y_k$ and $X_k$ vectors from the actual control network 54 for each controller time step. The simulation system 52 then initializes the state of its simulated process control network 64 with the state information from the actual control network 54. Moreover, in the tracking mode, an update module of the simulation system 52 recalculates the internal state variables ($\psi_k$) using the $U_{k-1}$ and $Y_k$ vectors to update the process model 66 so as to reflect the actual operation of the process during the last controller time-interval, thereby tracking or modeling the actual characteristics of the process 56 as measured or evident from the last controller scan time interval. Thus, while operating in the tracking mode, the simulation system 52 is continually initialized to the current plant conditions, including controller conditions and plant characteristics.

Figure 5:
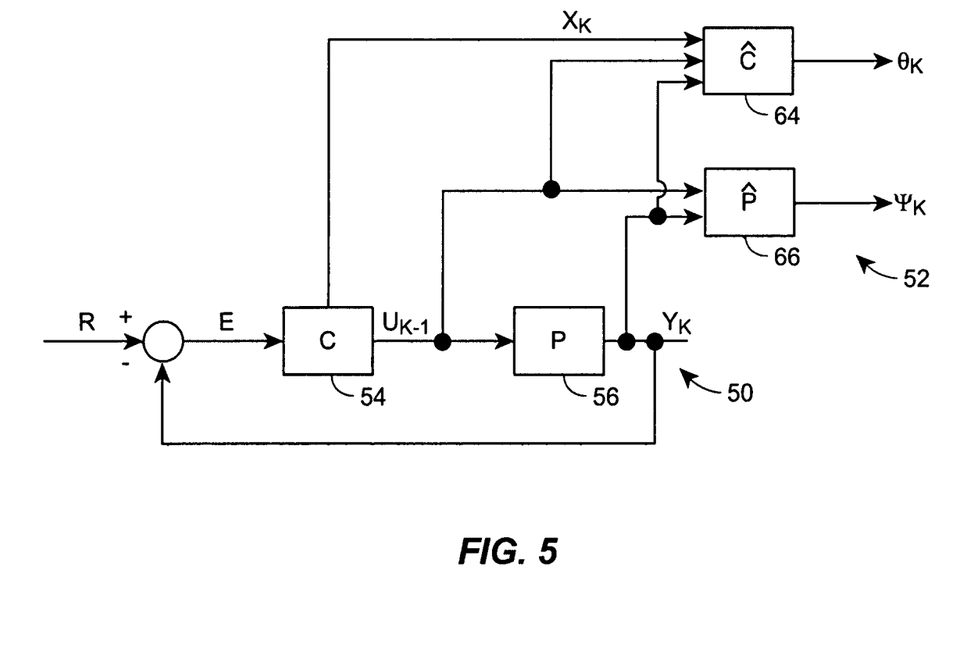
FIG. 5 is a logical block diagram illustrating the communicative interconnections between the simulation system and the control system of FIG. 2 during a tracking mode of operation.

FIG. 5 illustrates the operation of the simulation system 52 in the tracking mode in more detail. In particular, the process control system 50 is shown in FIG. 5 at the time instance k. However, in this case, the simulated process control network 64 of the simulation system 52 is configured to receive the internal state vector $X_k$ of the controller 54, the control signal vector $U_{k-1}$, and the process variable vector $Y_k$ and updates the simulated controller 64 with these vectors. Likewise, the process model 66 receives the control signal vector $U_{k-1}$ and the process variable vector $Y_k$ and determines the new process state vector $\psi_k$ from these values. In this manner, the process model 66 is updated after each scan of the process control system to reflect the actual operation of the process plant.

As will be understood, therefore, during tracking mode, the simulation system 52 is constantly following or tracking the process operation and is updating its state parameters to reflect the current state, not only of the process control network 54, but of the characteristics of the process 56 itself by recalculating, or updating the state of the process model 66. As a result, the simulation system 52 remains synchronized with the operation of the process control system 50 and the process plant at all times during the tracking mode, making the simulation system 52 immediately available at any time to perform simulation with a high degree of fidelity.

To perform a particular predictive simulation, the simulation system 52 may be, at any time, placed in a prediction mode to perform actual simulation of the process control system 50 over some future time horizon. The actual simulation may take many forms or may simulate many different types of controller/process activities. However, in all cases, the simulation system 52 operates in parallel with the actual control system 50. In particular, during the prediction mode, the simulation system 52 stops updating the control network image 64 and the process model 66 with signals from the actual process plant, but instead, operates to perform a prediction based on the most recent set of state variables $\hat{X}$ developed during the tracking mode. In other words, during the prediction mode, the simulated process variables $\hat{Y}$ are calculated based on the process model 66 in closed loop fashion using the simulated process control network 64 and the set points R provided to the simulation system 52. In this case, the simulation system 52 is coupled to a user interface to enable a user to, if desired, change one or more parameters of the simulated control system or the simulated process to thereby simulate the response of the process to a control change or to a process dynamics change. Such a change may, for example, be a change to one or more of the set-points R, a change of a measured process variable, a change to the control routine itself, a change to a disturbance variable in the process, etc.

If desired, the simulation system 52, while in the prediction mode, may execute in one of three sub-modes, including a real-time sub-mode, a fast-time sub-mode and a slow-time sub-mode. In the real-time sub-mode, the simulation of the process variables proceeds in real time (i.e. at the same speed or scan rate as the actual control system 50). In a power plant control system application, this mode may be utilized by plant personnel to test proposed actions and inputs to the control system. In this scenario, the proposed action is applied to the (simulated) plant and the simulated response is observed to ensure that the action has the desired effects and/or that no abnormal conditions arise as a result of the action.

In the fast-time sub-mode, the simulated process variables are calculated at a rate faster than real time (i.e., than the controller scan rate). This mode may be utilized to quickly observe the predicted response of the processes variables over a future time horizon, to test the response of the plant to a new controller set-point, bias, other operator input or some other change in a control routine, etc. For example, at any given time, the predicted values and resulting trajectories of one or more process variables can be displayed for the next ten minutes or over some other prediction horizon, such as a horizon associated with the process returning to steady state operation.

In the slow-time sub-mode, the operator may view the operation of the simulated control slower than the actual process operating time or scan rate. This sub-mode may be used in for example, fast processes to provide the operator with more time to view and analyze the operation of the process in response to a contemplated change. Moreover, this sub-mode may be advantageously used when the simulation system 52 is used to perform training operations.

During operation, the integrated and synchronized simulation system will alternatively utilize both the tracking and prediction modes to perform simulation and prediction. In particular, during the time periods when the simulation system 52 is operating in tracking mode, the simulation system 52 is constantly being updated with the overall state information from the actual control system 50. This state data, as described above, may be sent to the simulation system 52 by the control system 50 on a periodic basis using the signal addresses stored as part of the configuration system. In a preferred mode, the simulation system 52 will receive a new set of state data from the process control system during, or as a result of every scan of the controllers within the process control system 50. In other words, the state data within the process control system 50 may be collected after each controller operation or scan and sent to the simulation system 52. This data may be addressed or sent individually to the simulation system 52 using appropriate communication procedures, or may be collected at some intermediary device and sent as a bulk set of data to reduce communications overhead within the process control system. Of course, the simulation system 52 may instead receive the controller state information at a different rate, which is preferably a periodic rate, such as after every other scan, every fifth scan, etc. In this manner, while the simulation system 52 is in the tracking mode, the actual control system 50 and the simulation system 52 operate in synchronized fashion, which results from the fact that, at each time step associated with the periodic rate, the overall state of the simulation system 52 is updated to identically match the actual control system 50.

However, at any instant an operator or other user can put the simulation system 52 into the prediction mode. During operation in this mode, the sub-mode may be selected to be real-time mode to implement, for example, an evaluation of the effect of a set-point or tuning parameter change, to evaluate the effect of a control program change on the process, to evaluate a change in a process disturbance variable, etc. This feature provides the capability for the operator to perform "what-if" scenarios. In the case of evaluating a set-point change, the set-point change can be made on or provided to the simulation system via a user interface that is identical or generally the same as the user interface system associated with the control system 50 which would allow or enable such a change. In this manner, the operation of the simulation system 52 will look and feel the same as if the operator were operating the actual control system 50, making the simulation system easier to use and understand. Once the set-point change is made on the simulation system 52, the simulated process is then observed to ensure that the change has the desired or expected effect. This capability is targeted at eliminating human error in actual plant operation.

In the case of changing a control program, the program change may again be made using a configuration application that is the same as or that is similar to the configuration application used to make the programming change to the process control system 50 itself. Thus, again, the simulation system 52 may include a whole set of supporting applications, such as operator interface applications, configuration applications, trending applications, data processing or analysis applications, etc. that are provided for or are associated with the actual process control system 50. In any event, when the control routine change is made to the simulated controller network, the simulated process is monitored on the simulation system 52 to ensure that the desired effect is achieved and that no abnormal operational situations result. All human interaction with the simulator, that is intended to mimic operations on the actual control system 50, may be performed with the simulation system 52 operating in real-time mode or in slow-time sub-mode, if for example, training is being performed using the simulation system.

If desired, however, the effect of a longer time horizon can be observed by placing the simulation system 52 in the fast-time sub-mode. Additionally, the operator may switch between different sub-modes during the simulation. For example, the operator may place the simulation system 52 in the fast-time sub-mode once the interaction (e.g. the set-point change or the control program change) has been made via the operator interface.

In the fast-time sub-mode, the state of the simulation system evolves at a speed faster than the real-time scan or operational rate of the process control network 54. Of course, the fast-time and slow-time sub-modes may be implemented by changing the scan or operational period of the controllers and control programs within the simulated process control network 64. Moreover, if desired, the simulated process variables may be collected, stored and then reflected on associated historical trends at the end of the fast time execution, instead of or in addition to displaying these variables on the operator, engineer and maintenance personnel interfaces.

In some instances the simulation system 52 may be operated such that a fast-time execution cycle will be executed automatically every 'N' time steps of the control system 50, where 'N' may be defined by the operator if so desired. In this situation, the simulation system 52 operates in tracking mode until the 'Nth' time step, at which time the simulation system 52 is automatically placed in the prediction mode for a single execution of a fast-time operation over a selected time horizon. At the end of the fast-time simulation, the simulator displays may be updated with the predicted process variables over the configured time horizon and/or with other information, such as any simulated alarms or alerts which were generated during the fast-time operation, etc. At the end of this fast-time operation, the simulation system 52 automatically returns to the tracking mode to update the process model 66 and the simulated control network 64 with new state variables from the actual process. This automatic operating condition may be used to update trend displays which show the predicted trajectories of the process variable(s) of interest, which is particularly helpful in, for example, the real-time integration of control functions and simulation during actual operation of a power plant and for implementing an automatic method that has the potential to eliminate process upsets and plant trips due to human error. The effect of operator action on plant emissions and thermodynamic/process efficiency can also be observed in this mode.

While it is preferable to operate the simulation system on a computer that is communicatively connected to and integrated (with respect to communications) with the process control system, as is illustrated in the example of FIG. 1, it is also possible to operate or implement the simulation system 52 described herein on a dedicated computer that is not directly integrated with the control functions. In this case, however, the simulation system 52, which must include the closed-loop dynamics of the process control system, must continually receive the process variables and state variables from the control system. In particular, the state variables (including the process variables) must be continually sent from the control system to the simulation computer at a rate that enables the simulation to be performed in real-time. Such a communication interface may, however, be provided using any known or standard interface protocols, such as OPC, TCP/IP etc.

Moreover, if desired, the simulation system 52 may be distributed in different devices throughout the process plant. For example, the simulated process control network 64 may includes a simulation controller module (that is a copy of an actual control module) in each control device in which the actual control module 29 and 30 resides. In this case, the process model 66 may include a sub-model associated with a particular portion of the process plant (such as a particular process loop) disposed within the same process control device and communicatively connected to the appropriate simulation control model. Here, the simulation control module and the sub-model of the process operate together to perform simulation on a loop by loop basis within various different control devices. In this case, the simulation control modules may be in communication with operator interface routines stored within the workstations 20 and 22 using standard communications to indicate or illustrate the operation of the simulation control modules during the prediction mode. Likewise, the simulated control modules and the process models within the various devices within the plant may receive process state information directly from the associated control modules 29 and 30 of the actual process control network, or from an update module located within the same or a different device.

Of course, as will be understood, when used in a power generating plant, as well as other types of plants, the simulation system 52 as described herein may, among other things, (1) provide for the real-time integration of simulation and control functions during actual operation of a power plant, (2) provide a real-time prediction of emissions of a power generating plant over a finite future time horizon, (3) provide a mechanism for future generation market pricing, (4) enhance the effectiveness of the plant operations personnel by providing a real-time predictive function for each of the major process variables associated with the plant in response to the closed loop action of the control system, (5) provide a real-time indication of the onset of an abnormal situation, (6) allow the simulator initial conditions to be reset to a particular time period such that operating dynamics of the power plant can be "replayed" going forward in time from the time period that corresponds to the initial condition time step (which may be used to analyze past plant operation), (7) allow operations and/or engineering personal to evaluate the effect of a set-point, tuning parameter, configuration or programming change on the simulator before applying it to the actual plant, and (8) reduce plant trips due to operator action/inaction by providing a prediction of the major process variables for each time step extending over some finite future horizon.

Moreover, as will be understood, the simulation system described herein includes the novel approach of distributing the simulation functions as an integral part of the overall control functions. In this approach, the simulation is utilized as an augmentation of the control functions to provide predictive functions associated with the process variables. The requirements and constraints associated with distributing the simulation are identical to the corresponding control functions.

Figure 6:
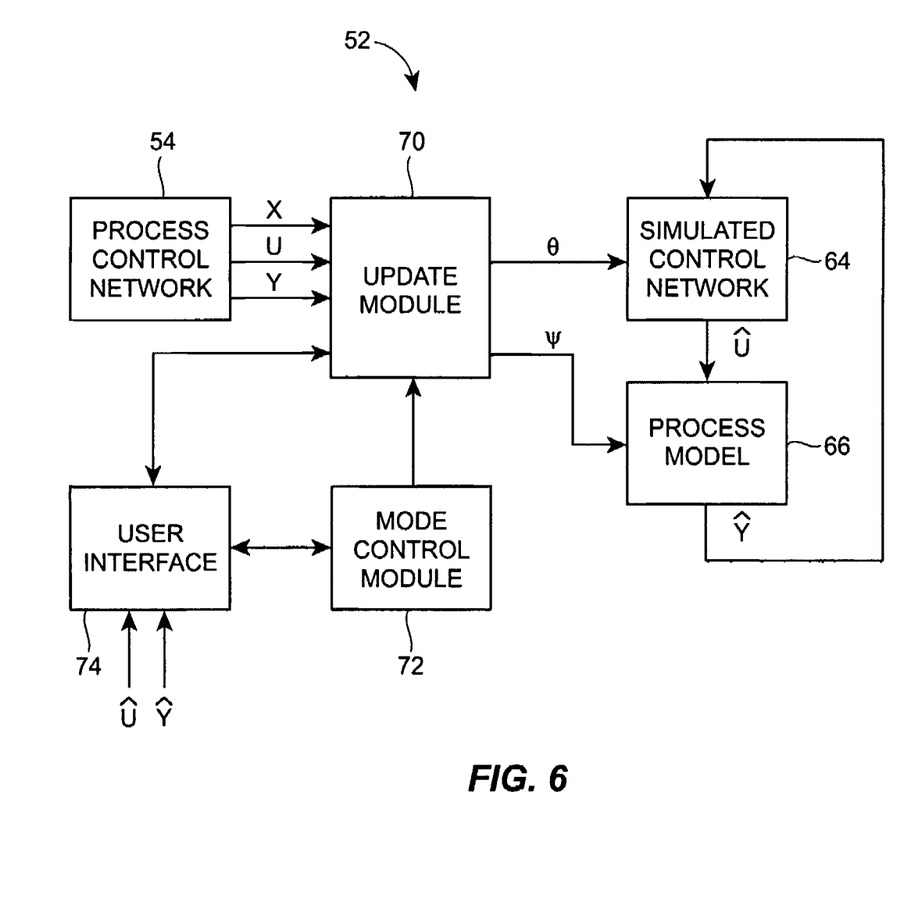
FIG. 6 is a block diagram of a simulation system that implements the features described herein.

FIG. 6 illustrates one manner of implementing the simulation system 52 described herein. In particular, the simulation system 52 of FIG. 6 includes the simulated process control network 64 communicatively coupled to the process model 66. However, as illustrated in FIG. 6, an update module 70 is communicatively coupled to the actual process control network 54, using any desired communication structure, to periodically receive the process control network state variables, including the controller state variables X, as well as the appropriate process input and output state variables, such as the control signals U and the process variables Y. If desired, the controller state variables X may be received at any periodic rate, which may be the same rate as or a different rate than the periodic rate at which the state variables U and Y are received from the process. Moreover, if desired, the controller state variables X may be received or updated at a periodic rate by being updated only when a change is actually made to one or more of these variables within the process control system 50.

The update module 70, which may be in the same or a different device than the simulated process control network 64 (or a portion thereof) and the process model 66 (or a portion thereof), operates during the tracking mode to receive the state variables X, U and Y and to calculate the state vector $\psi_k$ and to provide the $\theta$ and $\psi_k$ vectors to the appropriate parts of the simulated control network 64 and the process model 66.

The simulation system 52 also includes a mode control module 72 that controls the operation of the simulation system 52 to be in one of two modes. In particular, in a first mode, the update module 72 periodically receives the first and second state variables and updates the simulated process control network 64 and the process model 66 using the developed state variables $\theta$ and $\psi_k$. In a second mode, the simulated process control network 64 operates using the one or more simulated process variables $\hat{Y}$ to produce the one or more simulated control signals $\hat{U}$, and the process model 66 uses the one or more simulated control signals $\hat{U}$ to produce the one or more simulated process variables $\hat{Y}$. The mode control module 72 may operate the simulated process control network 64 in the second mode to execute at a real-time speed associated with the operational speed of the process control network 54, or at a speed that is either faster than or slower than the operational or real-time speed of the process control network 54. Moreover in one embodiment, the mode control module 72 may operate the simulated process control network 64 in the second mode to execute at a speed that is faster than the operational speed of the process control network 54 to produce a predicted process variable over a time horizon.

Still further, a user interface application 74 may be communicatively coupled to the update module 70, the mode control module 72, the simulated control network 64 and the process model 66 to perform user interface and display operations. In this case, the user interface application 74 may receive and display the simulated process variables $\hat{Y}$ and/or the simulated control signals $\hat{U}$ to a user, and may enable a user to change parameters within the simulated process control network 64, such as one or more set-points, a controller routine, etc., or one or more parameters within the process model 66, to perform any desired simulation activity. Still further, the user interface application 74 may operate in conjunction with the mode control module 72 to periodically and automatically operate the simulation system 52 in the second mode to execute at a speed that is faster than the operational speed of the process control network 54 to produce a predicted process variable at a time horizon and to display the predicted process variable at the time horizon (and any other simulated variables or information) to a user. Of course, the user interface may perform other desired operations as well.

When implemented, any of the simulation software described herein may be stored in any computer readable memory such as on a magnetic disk, a laser disk, or other storage medium, in a RAM or ROM of a computer or processor, etc. Likewise, this software may be delivered to a user, a process plant or an operator workstation using any known or desired delivery method including, for example, on a computer readable disk or other transportable computer storage mechanism or over a communication channel such as a telephone line, the Internet, the World Wide Web, any other local area network or wide area network, etc. (which delivery is viewed as being the same as or interchangeable with providing such software via a transportable storage medium). Furthermore, this software may be provided directly without modulation or encryption or may be modulated and/or encrypted using any suitable modulation carrier wave and/or encryption technique before being transmitted over a communication channel.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A simulation system for simulating the operation of a process control network as connected within a process plant, the simulation system comprising:

a simulated process control network that uses one or more simulated process variable signals to produce one or more simulated control signals based on a set of controller state variables to simulate the operation of the process control network as connected within the process plant;

a process model communicatively connected to the simulated process control network that uses the one or more simulated control signals to produce the one or more simulated process variables based on internal state variables associated with the process model; and an update module communicatively connected to the process control network, the simulated process control network, and the process model, wherein the update module periodically receives a first state variable vector indicative of values of internal state variables associated with a current configuration of one or more controllers of the process control network during operation of the process control network and periodically receives a second state variable vector including a set of control input variable values sent from the process control network to process plant equipment during operation of the process control network and including a set of process variable values measured within the process plant during operation of the process plant, wherein the update module periodically configures the controller state variables of the simulated process control network with the first state variable vector so as to synchronize the simulated process control network with the process control network during operation of the process control network, and wherein the update module periodically uses the set of control input variable values from the process control network and the set of process variable values of the second state variable vector to determine a process model state vector including the internal state variables associated with the process model and uses the process model state vector to update the process model.

2. The simulation system of claim 1, wherein the update module periodically receives the first and second state variable vectors at a scan rate used by one or more controllers within the process control network.

3. The simulation system of claim 1, wherein the simulation system includes a mode control module that controls the operation of the simulation system to be in one of two modes, including a first mode in which the update module periodically receives the first and second state variable vectors and updates the simulated process control network and the process model using the first and second state variable vectors and a second mode in which the simulated process control network operates using the one or more simulated process variables to produce the one or more simulated control signals, and the process model uses the one or more simulated control signals to produce the one or more simulated process variables based on the internal state variables associated with the process model.

4. The simulation system of claim 3, wherein the mode control module operates the simulated process control network in the second mode to execute at a real-time speed associated with the operational speed of the process control network.

5. The simulation system of claim 3, wherein the mode control module operates the simulated process control network in the second mode to execute at a speed that is either faster than or slower than the operational speed of the process control network.

6. The simulation system of claim 3, wherein the mode control module operates the simulated process control network in the second mode to execute at a speed that is faster than the operational speed of the process control network to produce a predicted process variable at a time horizon.

7. The simulation system of claim 3, wherein the mode control module periodically automatically operates the simulation system in the second mode to execute at a speed that is faster than the operational speed of the process control network to produce a predicted process variable at a time horizon and to display the predicted process variable at the time horizon to a user.

8. The simulation system of claim 1, further including a user interface that enables a user to make one or more changes to the simulated process control network to perform simulation of a changed process control condition.

9. The simulation system of claim 8, wherein the user interface enables a user to change one or more of a set-point or a control routine of the simulated process control network.

10. The simulation system of claim 1, further including a user interface that enables a user to make one or more changes to the process model to perform simulation of a changed process condition.

11. The simulation system of claim 1, wherein the simulated process control network is a copy of the process control network.

12. The simulation system of claim 1, wherein the first state variable vector includes a variable associated with a controller tuning parameter.

13. The simulation system of claim 12, wherein the controller tuning parameter includes a controller gain parameter or a controller reset parameter or a controller rate parameter or a fuzzy logic controller scaling factor or a neural network controller weighting factor.

14. The simulation system of claim 1, wherein the second state variable vector includes one or more of a process variable measurement signal or a control signal.

15. The simulation system of claim 1, wherein the simulated process control network includes a plurality of control modules, each control module coupled to a different process model, wherein each of the different process models is associated with a different part of the process.

16. The simulation system of claim 15, wherein different ones of the plurality of control modules are disposed in different computer devices.

17. A method of simulating the operation of a process control system having a process control network connected within a process plant, the method comprising:
periodically receiving a first state variable vector indicative of values of internal state variables associated with a current configuration of one or more controllers of the process control network during operation of the process control network;
periodically receiving a second state variable vector including a set of control input variable values sent from the process control network to process plant equipment during operation of the process control network and including a set of process variable values measured within the process plant during operation of the process plant;
periodically configuring a simulated process control network using the first state variable vector so as to synchronize the simulated process control network with the process control network during operation of the process control network;
periodically updating a process model using the second state variable vector, including using the set of control input variable values from the process control network and the set of process variable values of the second state variable vector to determine a process model state vector including internal state variables associated with the process model and using the process model state vector to update the process model; and
simulating operation of the process control system by applying one or more simulated process variable signals to the simulated process control network to produce one or more simulated control signals and using the simulated control signals in the updated process model to produce the one or more simulated process variables based on the internal state variables associated with the process model.

18. The simulation method of claim 17, wherein periodically receiving the first state variable vector includes periodically receiving the first state variable vector at a scan rate used by one or more controllers within the process control network.

19. The simulation method of claim 17, wherein periodically receiving the second state variable vector includes periodically receiving the second state variable vector at a scan rate used by one or more controllers within the process control network.

20. The simulation method of claim 17, wherein the first and second state vectors are received at the same periodic rate.

21. The simulation method of claim 17, wherein simulating operation of the process control system includes applying the one or more simulated process variable signals to the simulated process control network to produce the one or more simulated control signals, and using the one or more simulated control signals in the updated process model to produce the one or more simulated process variables at a real-time rate associated with the operational rate of the process control network.

22. The simulation method of claim 17, wherein simulating operation of the process control system includes applying the one or more simulated process variable signals to the simulated process control network to produce the one or more simulated control signals, and using the one or more simulated control signals in the updated process model to produce the one or more simulated process variables at a rate that is greater than the operational rate of the process control network.

23. The simulation method of claim 22, including performing the simulation operation to produce a predicted process variable at a time horizon.

24. The simulation method of claim 17, including periodically automatically simulating operation of the process control system at a speed that is faster than the operational speed of the process control network to produce a predicted process variable at a time horizon, and displaying the predicted process variable at the time horizon to a user.

25. The simulation method of claim 17, including enabling a user to make one or more changes to the simulated process control network prior to simulating the operation of the process control system, to thereby perform simulation of a changed process control condition.

26. The simulation method of claim 25, including enabling the user to change one or more of a set-point or a control routine of the simulated process control network.

27. The simulation method of claim 17, including developing the simulated process control network by copying the process control network.

28. The simulation method of claim 17, wherein periodically configuring the simulated process control network using the first state variable vector includes using a variable that is associated with a controller tuning parameter, within the first state variable vector.

29. The simulation method of claim 17, wherein periodically updating the process model using the second state variable vector includes using one or more of a process variable measurement or a control signal as the second state variable vector.

30. The simulation system of claim 1, further including a user interface application that enables a user to make changes to one or more of the simulated process control network or the process model, wherein the user interface application is the same as a user interface application used within the process control network.

* * * * *